June 27, 1967 J. W. HOLDEMAN 3,327,562
DIFFERENTIAL MECHANISM
Filed July 29, 1965
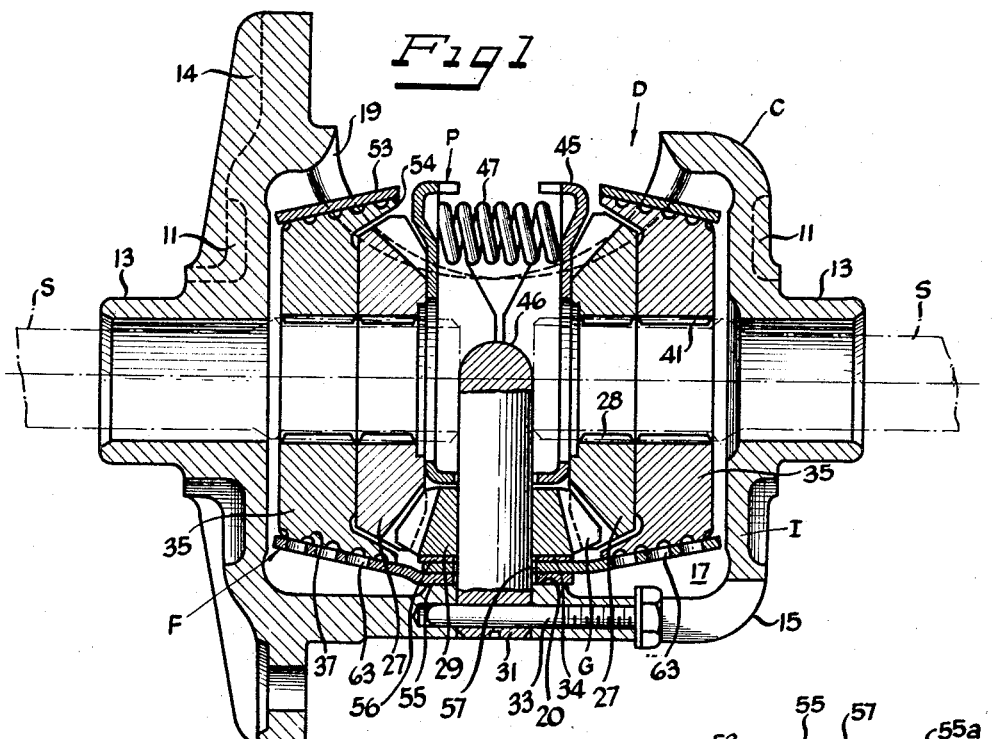
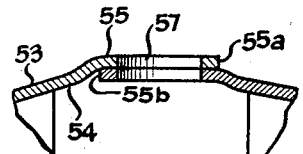
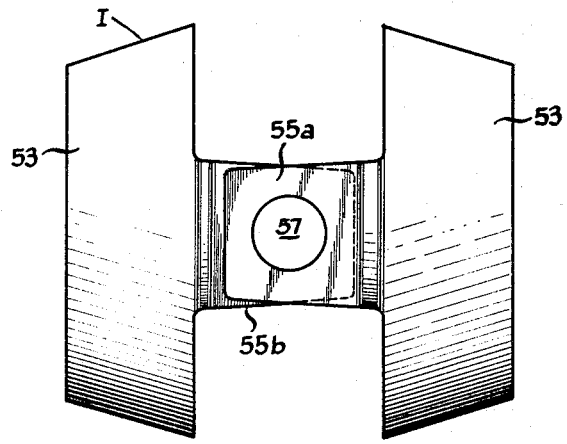
Inventor
JOHN W. HOLDEMAN United States Patent Office 3,327,562
Patented June 27, 1967

3,327,562
DIFFERENTIAL MECHANISM
John W. Holdeman, Auburn, Ind., assignor to Borg-Warner Corporation, Chicago, Ill., a corporation of Illinois
Filed July 29, 1965, Ser. No. 475,813
5 Claims. (Cl. 74—711)

This invention relates to limited slip differential mechanisms which provide a predetermined resistance to differential action. More particularly, it relates to limited slip differential mechanisms which utilize conically shaped clutch members to provide the resistance to free differentiation.

It is the principal object of the present invention to provide an improved form of limited slip differential mechanism utilizing a conically shaped clutch to resist differentiation.

It is a further object of the present invention to provide an improved form of limited slip differential mechanism utilizing conically shaped clutches to resist differentiation wherein the machining of conically shaped cone seat surfaces on the interior of the mechanism casing is eliminated.

It is another object of the present invention to provide an improved form of limited slip differential mechanism of the type described which includes separate removable inserts which form the conically shaped cone seat surfaces.

It is a further object of the present invention to provide a limited slip differential mechanism having removable cone seat inserts which are in driving engagement with the casing through the pinion pin and which are axially positioned within the casing by the pinion pin.

It is another object of the present invention to provide a limited slip differential mechanism having cone seat inserts which are unsupported at their convergent ends.

It is another object of the present invention to provide a removable cone seat insert for a limited slip differential mechanism.

These and other objects of the present invention will become apparent with reference to the following description and the accompanying drawing.

In the drawing:

FIGURE 1 is a revolved cross-sectional elevational view of a differential mechanism constructed in accordance with the present invention showing various of the features thereof;

FIGURE 2 is an elevational view of a portion of the apparatus of FIGURE 1 showing various other features of the invention;

FIGURE 3 is a fragmentary view partially in sections of the portion of the apparatus shown in FIGURE 2 illustrating particular details of the invention.

Very generally, the mechanism D includes a casing C surrounding adjacent ends of a pair of coaxially aligned relatively rotatable output shafts S. The casing C is adapted to receive input torque from a drive line system (not shown). A bevel gear system generally designated G is connected between the casing C and the shafts S and transmits rotational effort to the shafts while simultaneously allowing relative rotation between them when required, as when an automotive vehicle negotiates a corner.

A pair of friction clutches F provide the desired resistance to differential action. Each clutch includes a friction surface associated with the casing C and a friction surface associated with one of the output shafts S. Frictional engagement of these surfaces provides a direct path for transmission of rotational effort from the casing to the output shafts independent the bevel gear system G. The clutches, thus, overcome the inherent ability of the mechanism to allow differentiation between shafts and torque is transmitted to both shafts even though they may experience unequal loading. It should be appreciated that one such clutch associated with one of the output shafts S could be used.

The friction surfaces of the clutch F are maintained in engagement by a spring pack P which provides an initial preload to insure that at least a predetermined minimum resistance to differential action exists.

Each of the clutches F includes a removable insert I which is connected to the casing C for rotation therewith and which forms the friction surface of the clutch F associated with the casing C.

More specifically, and as best seen in FIGURE 1, the differential casing C is integrally formed as by casting, and may be constructed of any suitable material such as, for example, malleable iron.

The casing C includes a pair of spaced apart, generally parallel transverse walls 11 each of which includes a longitudinally elongated hub 13 adapted to receive one of the output shafts S. The hubs do not journal the shafts S, but rather support bearings (not shown) which position the mechanism D within the axle assembly.

One of the transverse walls 11 is provided with a radially directed flange 14 to which is secured a ring gear (not shown) adapted to receive input torque from the associated drive line system.

The transverse walls are connected by a longitudinally extending, generally cylindrical wall 15 which defines, with the walls 11, an internal cavity 17 surrounding the adjacent ends of the output shafts.

The cylindrical wall 15 is provided with a side port 19 defining a relatively large access opening for assembly purposes. The side port additionally allows lubricant to enter the cavity for lubrication of both the bevel gear system G and the clutches F. The interior surface of the wall 15 includes a pair of generally flat surfaces 20 disposed in 180° spaced apart facing relation. These surfaces are disposed approximately 90° from the side port opening 19 and are utilized to support the inserts I within the casing C as will be explained.

Referring now to the bevel gear system G, best seen in FIGURE 1, there is provided an arrangement which transmits output torque to the shafts S and simultaneously allows relative rotation between shafts when necessary, as when a vehicle is cornering.

The bevel gear system includes a pair of side gears 27, each of which is connected to one of the shafts S for rotational movement therewith and axial movement thereon. To effect this relationship between the shafts and side gears, the adjacent ends of the shafts S and the internal bore of the gears are splined as at 28.

The side gears are in constant mesh with a pair of pinion gears 29 supported by a transversely extending pinion pin 31 disposed intermediate the adjacent ends of the shafts S and secured to the casing C for rotation therewith by retainer screw 33. The pinion gears include generally flat surfaces 34 which, when the mechanism is assembled, lie in a plane generally parallel to the surfaces 20 of the casing C.

As can be appreciated, rotation of the differential casing C by the drive line system causes the pinion pin 31 to revolve about the centerline of the shafts S. The pinion gears 29, therefore, transcribe a generally cylindrical path about the axis of the shafts, and as they are in mesh with the side gears 27, the side gears are caused to rotate and thereby transmit torsional effort to the output shafts S.

If one of the output shafts is required to rotate at a different speed than the other, as when cornering, the pinion gears 29 not only revolve about the longitudinal axis of the output shafts, but also rotate about the pinion pin 31 allowing relative movement between the side gears 27. Consequently, the output shafts S rotate relative to each other as well as relative to the casing C.

Differentiation, i.e., relative rotation between the shafts, inherently possible by virtue of the above described structure, is resisted by the engagement of the friction surfaces of the clutches F. Each of these clutches includes a frustoconical clutch member 35 and one of the cone seat inserts I frictionally engaged by the member 35 along a complementary conical surface.

A spirally progressing groove 37 is provided in the conical surface of the clutch member 35 for distribution of oil or other lubricant to the frictionally engaged surfaces.

Each clutch member 35 includes an internally splined bore 41 connected to one of the shafts S and is, therefore, rotatable with the shaft and axially movable thereon. Each of the clutch members 35 is disposed between one of the transverse walls 11 of the casing C and one of the side gears 27. The respective side gear 27 and the clutch member 35 on each shaft S are in radial contact along the surface 43 and movement of either of these members toward the other, therefore, causes a corresponding movement of the other element in the same direction.

Application of axial force upon the side gears and consequently upon the clutch members 35 is accomplished in two ways; first, initial frictional engagement of the clutch members 35 with the drum or seat surface of the inserts I is provided by the spring pack P. The spring pack generally surrounds the transverse pinion pin 31 and includes a pair of gear contacting members 45, each of which is in contact with one of the side gears 27 adjacent the pinion pin. Each of the gear contacting members includes axially extending flanges having openings 46 to provide clearance for the pinion pin 31. A plurality of compressed coil springs 47 extend longitudinally between the contacting members 45 and urge them axially outwardly. This axial loading is transmitted to the side gears which are axially movable on the shafts S. The side gears, in turn, transmit the axial force to the clutch members 35, which are also splined to the shafts S and consequently are free to move axially into frictional engagement with the conical friction surface on the insert I.

Secondly, the initial frictional engagement of the clutch member 35 with the insert I, provided by the spring pack P, is increased, generally as a function of the torsional input to the mechanism casing C by the bevel gear system G.

Application of torque to the mechanism creates axial separating forces upon the side gears 27 which forces are, in turn, transferred to the clutch members 35 to provide a cumulative increased frictional engagement of the clutches with the conical inserts I to resist differentiation.

In accordance with the present invention, as best seen in FIGURE 1, the conical drum or seat surfaces frictionally engaged by the clutch members 35 are provided by the removable cone seat inserts I which form the friction surfaces of the clutches F associated with the casing C. These inserts include a generally conically shaped wall portion 53, the interior of which includes a conical seat surface 54 engaged by the clutch member 35. The inserts I may be formed of any suitable material such as, for example, steel, and may be made by any one of several manufacturing processes such as stamping, turning, spinning, grinding, etc. They may also be made from tubing sections, formed to the desired configuration.

In the illustrated embodiment the convergent end of the conical wall of each of the inserts I is totally unsupported with respect to the casing C. The entire connection between the casing and the inserts is effected through generally flat laterally extending flanges 55 formed at the divergent ends of the conical walls 54.

Each insert includes an external flange 55a and an internal flange 55b disposed in 180° spaced apart relation, best seen in FIGURE 3. The flanges of the two inserts are disposed in overlying relation at the approximate center of the cavity 17, intermediate the flat surfaces 20 of the casing and the pinion gears 29. A flat thrust washer such as the washer 56 may be provided to prevent wear of the internal flange 55b by rotation of the pinion gears.

The outer surfaces of external flanges 55a are piloted upon the flat surfaces 20 of the casing C and the outer surfaces of the internal flanges are piloted on the inner surface of the external flanges to effect radial location of the inserts with respect to the casing C and consequently, with respect to the clutch member 35.

The surfaces 20 could be generally cylindrical and correspondingly curved flanges could be provided. With such an arrangement, the pinion gears 29 would have spherical backs instead of the flat surfaces 34.

Each flange includes an aperture 57. The pinion pin 31 extends through the apertures 57 and thus effects driving engagement between the inserts I and the casing C. The diameters of the pinion pin and the apertures are such that this arrangement further serves to axially position the inserts with respect to the casing. The pin 31 prevents axial movement of the inserts upon frictional engagement of the clutch members 35 with the conical surfaces 54.

With this arrangement, radial and axial positioning of the inserts with respect to the casing C as well as the establishment of a driving engagement between the casing and the inserts is effected through the longitudinally extending flanges 55 formed at the divergent ends of the conical walls 53 which engage the pinion pin 31. The components may, therefore, be simply constructed with only a minimal amount of machining to the interior of the casing. The inserts also may be easily formed without the necessity of using complex manufacturing procedures. No radial pilot or axial stop surfaces need be formed within the casing, except for the flat surfaces 20 which are easily formed by milling or broaching to the proper size. The inserts are easily formed in conical shape and the flanges at the divergent end need only to be sized for radial location of the inserts and provided with an easily formed aperture to accept the pinion pin 31.

As stated, each insert includes an internal flange 55a and an external flange 55b. In this manner only one insert configuration need be used and the inserts may be disposed in 180° alternated positions with the internal flange of one insert cooperating with the external flange of the other.

Of course, it may be desirable to utilize only one clutch member associated with one output shaft to resist differential action. With this arrangement both flanges of the insert I would be formed as the external flange 55a so that each would contact the flat surfaces 20 to radially position the insert.

Each insert I is provided with a plurality of lubricating orifices 63 to supply lubricant to the spirally progressing groove 37 of the clutch member 35. These orifices are disposed longitudinally along the insert conical wall 53 in one or more rows as desired. Lubricant within the cavity 17 of the casing C may pass through these orifices into communication with the spiral grooves 37 for distribution to the frictionally engaged surfaces. Other forms of lubricant distribution facilitates could also be used without departing from the scope of the invention.

In assembling the mechanism each insert is placed in overlying relation to one of the clutch members 35 and the components are inserted within the casing C through the side port opening 19. The inserts are positioned such that the external flange of one insert overlies the internal flange of the other and the outer surfaces of the external flanges are in axial contact with the flat surface 20 of the casing C. A spacer between the surfaces 20 and the external flanges 55b may be used to ease the assembly procedure as the flanges must be rotated into position between the spaced apart surfaces 20. The flanges are then positioned in proper alignment for insertion of the pinion pin 31.

The side gears 27 are then placed in contacting relation with the clutch members 35 along the surfaces 43 or, alternatively, the side gears and clutch members may be integrally formed.

The pinion gears are then positioned in mesh with the side gears in 180° opposed facing relation and the bevel gear system G is then rotated into alignment for insertion of the pinion pin 31. When the side gears are positioned within the cavity 17, thrust washers such as the washers 56 may be positioned upon the pinion gears and moved into alignment with the flanges 55 of the inserts when the bevel gear system is rotated.

The spring pack P is then compressed and installed through the side port opening with the gear contacting members aligned so as to accept the pinion pin. The pinion pin is then inserted through the flanges 55 of the inserts I, the thrust washers 56, pinion gears 29 and gear contacting members 45 and secured to the casing C with the retainer screw 33 to complete the assembly of the device.

As can be appreciated, a novel arrangement for a limited slip differential mechanism has been provided which incorporates easily-formed cone seat inserts retained within a simply constructed differential casing by the bevel gear system pinion pin.

Various of the features of the invention have been particularly shown and described, however, it should be obvious to one skilled in the art that various modifications may be made without departing from the scope of the invention.

I claim:

1. A limited slip differential mechanism comprising a differential casing adapted to receive an input torque for transmission to a pair of coaxially aligned, relatively rotatable output shafts; at least one removable insert disposed internally of said casing, said insert defining a conical seat surface and including means adjacent the divergent end of said conical seat surface contacting said casing to radially position said insert with respect thereto, said means being connected to said casing by means effecting axial positioning of said insert with respect to said casing and effecting a driving engagement between said insert and said casing through said first mentioned means; at least one conical clutch member disposed within said casing and adapted to be connected to one of the output shafts; biasing means urging said clutch member into a predetermined frictional engagement with said conical seat surface; and a bevel gear system including at least one pinion gear and at least one side gear within said casing adapted to be operatively connected to the output shafts for transmission of rotational effort thereto and to apply an axial force upon said cluch member in a direction to increase said frictional engagement.

2. A limited slip differential mechanism comprising a differential casing adapted to receive an input torque for transmission to a pair of coaxially aligned, relatively rotatable output shafts, at least one removable insert disposed internally of said casing, said insert including a generally conical wall defining a generally conical seat surface, and including a pair of flanges extending longitudinally of said conical wall adjacent the divergent end of said conical seat surface in circumferentially opposed spaced apart relation said flanges having surfaces contacting said casing to radially position said insert with respect thereto, and means securing said flanges to said casing to axially position said insert with respect to said casing and to effect a driving relation between said insert and said casing; at least one conical clutch member disposed within said casing and adapted to be connected to one of the output shafts; biasing means urging said clutch member into a predetermined frictional engagement with said conical seat surface; and a bevel gear system including at least one pinion gear and at least one side gear within said casing adapted to be operatively connected to the output shafts for transmission of rotational effort thereto and to apply an axial force upon said clutch member in a direction to increase said frictional engagement.

3. A limited slip differential mechanism comprising a hollow differential casing adapted to receive an input torque for transmission to a pair of coaxially aligned, relatively rotatable output shafts, at least one removable insert disposed internally of said casing, said insert including a generally conical wall defining a generally conical seat surface, and including a pair of flanges extending longitudinally of said conical wall adjacent the divergent end of said conical seat surface in circumferentially opposed spaced apart relation said flanges having surfaces contacting said casing to radially position said insert wth respect thereto, each of said flanges further having a generally circular aperture extending therethrough; at least one conical clutch member disposed within said casing and adapted to be connected to one of the output shafts; biasing means urging said clutch member into a predetermined frictional engagement with said conical seat surface; and a bevel gear system including at least one pinion gear and at least one side gear within said casing adapted to be operatively connected to the output shafts for transmission of rotational effort thereto and to apply an axial force upon said clutch member in a direction to increase said frictional engagement, said bevel gear system further including a pinion pin secured to said casing and extending generally diametrically of said casing, said pinion pin being disposed in said apertures of said flanges of said insert to axially position said insert with respect to said casing and to provide a driving engagement between said casing and said insert.

4. A limited slip differential mechanism comprising a hollow differential casing adapted to receive an input torque for transmission to a pair of coaxially aligned relatively rotatable output shafts, a pair of removable inserts disposed internally of said casing, each of said inserts including a generally conical wall defining a conical seat surface, said inserts being disposed within said casing with said conical surfaces positioned in longitudinally spaced apart facing relation with their divergent ends in facing relation, each of said inserts further including a pair of flanges extending longitudinally of said conical wall adjacent the divergent end of said conical seat surfaces, said flanges being positioned in circumferentially opposed spaced apart relation with one of said flanges defining an external flange and the other thereof defining an internal flange, the external flange of each insert overlying the internal flange of the other of said inserts and a surface of each of said external flanges contacting said casing to radially position said inserts, said flanges of each of said inserts being connected to said casing in a manner so as to be positioned axially with respect to said casing and so as to be in driving engagement with said casing; a pair of conical clutch members disposed within said casing each of which is adapted to frictionally engage one of said conical surfaces and further adapted to be connected to one of said output shafts; biasing means urging said clutch members into a predetermined frictional engagement with said conical seat surfaces; a bevel gear system including at least one pinion gear and at least one side gear within said casing adapted to be operatively connected to the output shafts for transmission of rotational effort thereto and to apply an axial force upon said clutch members in a direction to increase said frictional engagement.

5. A limited slip differential mechanism comprising a hollow differential casing adapted to receive an input torque for transmission to a pair of coaxially aligned relatively rotatable output shafts, said casing including a pair of internally formed generally flat surfaces disposed in spaced apart facing relation; a pair of removable inserts disposed internally of said casing, each of said inserts including a generally conical wall defining a conical seat surface, said inserts being disposed within said casing with said conical surfaces positioned in longitudinally spaced apart facing relation with their divergent ends in facing relation, each of said inserts further including a pair of generally flat flanges extending longitudinally outwardly of said conical wall adjacent the divergent end of said conical seat surfaces, said flanges being positioned in circumferentially opposed spaced apart relation with one of said flanges defining an external flange and the other thereof defining an internal flange with the external flange of each insert overlying the internal flange of the other of said inserts and a surface of each of said external flanges contacting one of said flat surfaces of said casing to radially position said inserts with respect to said casing, each of said flanges including a generally circular aperture, the apertures of one of said flanges being generally aligned with the apertures of the other of said inserts; a pair of conical clutch members disposed within said casing each of which is adapted to frictionally engage one of said conical surfaces and further adapted to be connected to one of said output shafts; biasing means urging said clutch members into a predetermined frictional engagement with said conical seat surfaces; a bevel gear system including at least one pinion gear and at least one side gear within said casing adapted to be operatively connected to the output shafts for transmission of rotational effort thereto and to apply an axial force upon said clutch members in a direction to increase said frictional engagement, said bevel gear system including a pinion pin secured to said casing and extending generally diametrically of said casing said pinion pin extending through said apertures of said flanges of said inserts to axially position said inserts wth respect to said casing and to provide engagement between said casing and said inserts.

References Cited

UNITED STATES PATENTS 3,186,258 6/1965 Meldola _____ 74—710.5
3,224,299 12/1965 Holdeman et al. _____ 74—711

FOREIGN PATENTS 1,236,299 6/1960 France.

FRED C. MATTERN, JR., *Primary Examiner.*

J. A. WONG, *Assistant Examiner.*